UNITED STATES PATENT OFFICE.

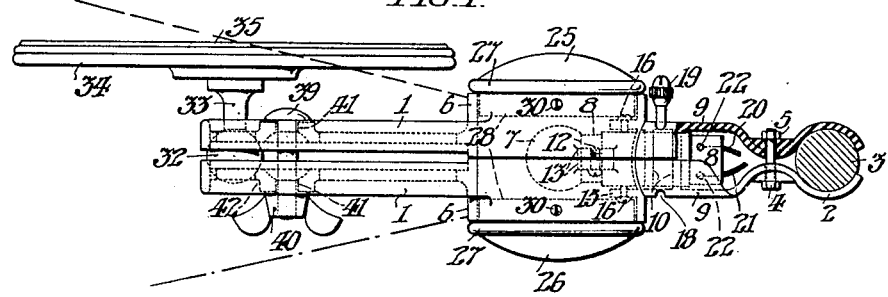

EDWIN M. ROSENBLUTH, OF WALLINGFORD, PENNSYLVANIA.

AUTOMOBILE ACCESSORY.

1,389,901. Specification of Letters Patent. Patented Sept. 6, 1921.

Application filed December 18, 1919. Serial No. 345,860.

*To all whom it may concern:*

Be it known that I, EDWIN M. ROSENBLUTH, a citizen of the United States, residing at Wallingford, in the county of Delaware and State of Pennsylvania, have invented a certain new and useful Improvement in Automobile Accessories, whereof the following is a specification, reference being had to the accompanying drawing.

In accordance with the various municipal regulations; automobiles and other vehicles which are left "parked," *i. e.*, standing stationary in public places, after nightfall, shall be provided with a light indicating their position. As a matter of economy, such a light should be as small as possible to minimize the consumption of energy in maintaining it and, therefore, it is advantageous to the vehicle owner to have a lamp for that specific purpose, which is smaller than the head lamps which are required for such vehicles after nightfall; so that the latter lamps which consume more energy, may be extinguished and the smaller lamp lighted when the vehicle is "parked." Moreover, it is advantageous for the operator of a vehicle, particularly in crowded streets, to have a mirror so disposed thereon that the operator may see therein a reflection of the thoroughfare and vehicles thereon at the rear of the vehicle carrying the mirror.

Therefore, it is an object of my invention to provide a single structure having means to detachably secure it to an automobile, or other vehicle, and including means to coöperatively hold, in relatively adjusted relation, a parking lamp and a mirror.

As hereinafter described, my invention includes a structure comprising a bracket, conveniently formed of two oppositely counterpart members having at one end a base adapted to detachably secure the entire structure to a vehicle; having at the other end, means to adjustably hold a mirror, in variable angular relation to said bracket, and having between said mirror and said base, and in such position as to illuminate a field being reflected by said mirror, a lamp casing preferably inclosing an electric incandescent lamp; said bracket structure, adjacent said lamp body, incasing switch means whereby said lamp may be lighted and extinguished. The lamp element of the structure hereinafter described, includes means to project a red light rearwardly and a white light forwardly, with respect to the vehicle, so as to indicate its position, and the construction and arrangement is such that said mirror may be reversed to afford a reflected view of either of the fields respectively illuminated by the red light and by the white light. Moreover, said structure is so proportioned that the mirror may be tilted to receive and reflect light from said lamp so that, without changing the position of said lamp, a spot light therefrom may be projected in different directions at the will of the operator. The latter feature is advantageous in that said mirror may be thus adjusted to spot light the step at the door of an automobile, when the vehicle is stationary, and may be tilted to afford a rear view of the road illuminated by said lamp, when the vehicle is traveling.

My invention includes the various novel features of construction and arrangement hereinafter more definitely specified.

In said drawing; Figure I is a plan view, partly in section, of a structure conveniently embodying my invention and having at the right hand side thereof a base clamp for detachably engaging a substantially vertical side member of an automobile; for instance, the vertical side bar of a dash or wind shield.

Fig. II is a sectional view of said structure, taken on the lines II, II in Fig. I.

Fig. III is a front elevation of a modified form of my invention, having, at the bottom thereof, a base adapted for detachable connection with a substantially horizontal portion of the automobile structure; for instance, the top of a mud guard.

Fig. IV is an elevation of the right hand side of said structure as shown in Fig. II.

Referring to the form of my invention shown in Fig. I, the bracket structure includes the two oppositely counter-part members 1, 1 which may be conveniently formed of cast, drop forged, or pressed metal. Said members 1 have, at their right hand ends, jaws 2 which are opposed to form a clamp for the bar 3, element of the vehicle, by which the entire structure is supported; said jaws 2 being adapted to be drawn together upon said bar 3 by means of the bolt 4 and nut 5. Said members 1 includes oppositely counterpart annular frames 6 which form a casing for the lamp 7 which is, conveniently, an incandescent electric light globe having the cylindrical plug 8 which extends in the cylindrical tubular socket formed by the hollow shanks 9 of said members 1. I find it convenient to provide internal ribs 10 in said shanks 9 to bear upon said plug 8 so that said members 1, when held together, as shown in Fig. I, rigidly hold said lamp 7, by its plug 8, in the operative position indicated, with respect to the lamp casing. Said members 1 are clamped together, in that position, by two screws 12 which connect lugs 13 upon the respective members 1, upon opposite sides of said lamp.

Moreover, I find it convenient to provide each of said members 1 with a lug 15 through which screws 16 impinge upon said lamp plug 8.

Each of said members 1 has an arcual slot 18 extending through its shank 9 to permit oscillatory movement of a switch lever 19, whereby the circuit for said lamp 7 may be opened or closed at the will of the operator. Said circuit includes the supply conductors 20 and 21 which are entered in openings in said plug 8, parallel with its axis, and held by screws 22 extending laterally in said plug; so that it is necessary to remove said plug from said bracket to detach said conductors, and tampering with the latter is thus prevented.

Said lamp casing formed by the annular frames 6 is closed at its axially opposite ends by the translucent panels 25 and 26, conveniently formed of molded glass; the panel 25 being red and the panel 26 white. Said panels 25 and 26 are respectively mounted in annular frames 27, conveniently formed of pressed sheet metal, having tubular extensions 28 which extend inwardly in said frames 6 of the members 1 and are detachably held therein as best shown in Fig. II. Each of said frames 27 has an opening upon one side to receive a stud 29 which is fixed in the adjacent bracket member 1, and each of said frames 27 has, upon the opposite side an opening to receive the threaded end of a screw 30. The construction last described is such that when its screw 30 is removed, either frame 27 may be swung outwardly upon its stud 29 far enough to be lifted laterally from said stud but, normally, said frames 27 with their respective translucent panels 25 and 26 are held in rigid relation with the remainder of the structure, in the position shown in Fig. II.

As best shown in Fig. II, the bracket members 1, at the left of the frames 6 shown in Fig. I, have side flanges which stiffen them throughout their length and which merge into said frames 6. Adjacent the left hand ends of said members 1, as shown in Fig. I, their webs, intermediate of said flanges, have circular openings 31 which are opposed in axial alinement and which form a socket for the ball 32 on the shank 33 supporting the frame 34 of the mirror 35, which latter may be a plane or curved disk of silvered glass. As best shown in Fig. III, the extreme left hand ends of said members 1 are provided with slots 37 slightly wider than said mirror shank 33, so that the latter may be swung through an arc of more than 180° to present the mirror in the position shown in full lines in Fig. I in which it is adapted to reflect the field illuminated by the light projected through the panel 25, or said mirror may be swung through an arc of 180° to reflect a field illuminated by the light projected through the panel 26 or, said mirror 35 may be inclined to present its outer face in the position shown by the dash line in Fig. I, to receive and reflect light projected from said panel 25; or said mirror may be adjusted to the position indicated by the dot and dash line shown in Fig. I to receive and reflect light projected through said panel 26, to afford a variable spot light as above contemplated. Moreover, the size of said openings 31 is such, in proportion to said shank 33, that said mirror 35 is capable of universal angular adjustment, to a limited extent, but sufficient for all of the purposes herein contemplated. Said mirror 35 may be clamped and rigidly held in any desired position of adjustment in said bracket, by means of the bolt 39 and wing nut 40; said bolt extending through axially alined openings 41 in the respective bracket members 1, which openings are surrounded by bosses 42, respectively engaged by the head of said bolt 39 and said nut 40 as shown in Fig. I. Removal of said mirror 35 is prevented by said screws 12.

The form of my invention shown in Figs. III and IV, differs from that shown in Fig. I, only in the form of the base by which it is detachably connected with the vehicle. In Figs. III and IV, the bracket members 1 have oppositely counterpart bases 45 adapted to rest upon a substantially flat surface and maintain the structure in the upright position shown. Each of said base members 45 is conveniently provided with two openings 46 so that said structure may be secured by four screws or bolts, upon a mud guard or other substantially horizontal portion of a vehicle.

However, Fig. III shows the structure with the panel 26 omitted so as to more clearly disclose the interior construction and arrangement of the lamp casing, as above described.

Although I have shown the two embodiments of my invention, respectively adapted to extend horizontally and vertically; it is obvious that such a structure might be otherwise arranged and supported. Therefore, I do not desire to limit myself to the precise details of construction and arrangement herein set forth, as various modifications may be made therein, without departing from the essential features of my invention as defined in the appended claims.

I claim:

1. The combination with a bracket including two oppositely counterpart members having at one end jaws which are opposed to form a clamp, by which said bracket may be detachably connected with a vehicle; said bracket members including oppositely counterpart annular frames forming a lamp casing; of an incandescent electric lamp fitted in said casing and having a cylindrical plug extending in hollow shanks of said bracket members; opposite lugs on the respective bracket members, extending in said lamp casing; screw means connecting said lugs, adapted to clamp said bracket members together upon said lamp plug; another lug in said lamp casing, having a screw adapted to impinge upon said lamp plug; a switch in said lamp plug, having a radial lever extending through an arcual slot in one of said bracket shanks; whereby the circuit for said lamp may be opened or closed, at the will of the operator; a red translucent panel at one end of said lamp casing; a white translucent panel at the other end of said lamp casing; means detachably securing said lamp panels in said casing, including stationary studs extending radially inward from the respective bracket members, screw members extending radially inward from the respective bracket members, and annular frames on said panels having openings adapted to receive said studs and screws; said bracket members having means at their ends opposite said jaws, adapted to detachably secure a mirror, including circular openings in said bracket members, opposed in axial alinement to form a ball socket, and radial end slots in said members extending from said socket; a mirror comprising a circular disk having an axial shank fitted to said slots and carrying a ball fitted between said bracket members; and a bolt extending through said bracket members, adjacent said ball, and provided with a nut, whereby said mirror may be held in adjusted position to selectively reflect the fields illuminated by light projected through said panels; said mirror being capable of universal angular adjustment limited by the construction and arrangement of said bracket members.

2. The combination with a bracket including two oppositely counterpart members having at one end supporting means arranged to detachably connect them with a vehicle; said bracket members including oppositely counterpart annular frames forming a lamp casing; an electric lamp fitted in said casing; screw means in said casing adapted to clamp said bracket members together upon said lamp; a switch in said bracket having a radial lever extending through an arcual slot in one of said bracket members; whereby the circuit for said lamp may be opened or closed, at the will of the operator; a translucent panel at each end of said lamp casing; means detachably securing said lamp panels in said casing; said bracket members having means at their ends opposite said supporting means, adapted to detachably secure a mirror, including openings in said bracket members, opposed to form a ball socket; a mirror comprising a circular disk having an axial shank carrying a ball fitted in said socket between said bracket members; and screw means in said bracket members, adjacent said ball, whereby said mirror may be held in adjusted position to selectively reflect the fields illuminated by light projected through said panels; said mirror being capable of universal angular adjustment limited by the construction and arrangement of said bracket members.

3. The combination with a bracket formed of two oppositely counterpart members having at one end supporting means arranged to detachably secure them to a vehicle, and having at the other end means arranged to adjustably hold a mirror in variable angular relation to said bracket, including axially alined circular openings in the respective bracket members, with radial slots at the ends of the latter, and having between said mirror and said supporting means, and in such position as to illuminate a field being reflected by said mirror, a lamp casing, formed of axially alined circular frames respectively parts of said bracket members; an electric incandescent lamp, in said casing; screw means, carried by said bracket, arranged to adjustably construct said lamp in said casing; a red translucent panel at one end of said lamp casing; a white translucent panel at the other end of said lamp casing; means detachably securing said panels in said bracket, including metallic frames on said panels, studs in said bracket members adapted to engage openings in said panel frames, and screws in said bracket members adapted to engage other openings in said panel frames; a switch casing, formed by oppositely recessed portions of said bracket members; an electric switch in said switch casing, in operative relation with said lamp; and a switch lever extending through a slot in one of said bracket members.

4. The combination with a bracket formed of two opposite members having at one end supporting means arranged to detachably secure them to a vehicle, and having at the other end means arranged to adjustably hold a mirror in variable angular relation to said bracket, including openings in the respective bracket members, with slots at the ends of the latter, and having between said mirror and said supporting means, and in such position as to illuminate a field being reflected by said mirror, a lamp casing, including integral parts of said bracket members; of an electric incandescent lamp, in said casing; screw means, carried by said bracket, arranged to adjustably hold said lamp in said casing; a red translucent panel at one end of said lamp casing; a white translucent panel at the other end of said lamp casing; means detachably securing said panels in said bracket, including metallic frames on said panels, studs in said bracket members adapted to engage openings in said panel frames, and screws in said bracket members adapted to engage other openings in said panel frames; a switch casing, including integral parts of said bracket members; and an electric switch in said switch casing, in operative relation with said lamp.

5. The combination with a bracket formed of two opposite members having at one end supporting means arranged to detachably secure them to a vehicle, and having at the other end means arranged to adjustably hold a mirror in variable angular relation to said bracket, including openings in the respective bracket members, with slots at the ends of the latter, and having between said mirror and said supporting means, and in such position as to illuminate a field being reflected by said mirror, a lamp casing, including integral parts of said bracket members; of an electric incandescent lamp, in said casing; screws means, carried by said bracket, arranged to adjustably hold said lamp in said casing; a red translucent panel at one end of said lamp casing; a white translucent panel at the other end of said lamp casing; means detachably securing said panels in said bracket, including metallic frames on said panels, studs in said bracket members adapted to engage openings in said panel frames, and screws in said bracket members adapted to engage other openings in said panel frames; a switch casing, including integral parts of said bracket members; and an electric switch in said switch casing, in operative relation with said lamps.

6. The combination with a bracket formed of two opposite members having at one end supporting means arranged to detachably secure them to a vehicle, and having at the other end means arranged to adjustably hold a mirror in variable angular relation to said bracket, including openings in the respective bracket members, with slots at the ends of the latter, and having between said mirror and said supporting means, and in such position as to illuminate a field being reflected by said mirror, a lamp casing, including integral parts of said bracket members; of an electric incandescent lamp, in said casing; screw means, carried by said bracket, arranged to adjustably hold said lamp in said casing; a red translucent panel at one end of said lamp casing; a white translucent panel at the other end of said lamp casing; means detachably securing said panels in said bracket; a switch casing, including integral parts of said bracket members; and an electric switch in said switch casing, in operative relation with said lamp.

7. The combination with a bracket formed of two opposite members having at one end supporting means arranged to detachably secure them to a vehicle, and having at the other end adjustable clamping means arranged to adjustably hold a mirror in variable angular relation to said bracket; and having between said mirror and said supporting means, and in such position as to illuminate a field being reflected by said mirror, a lamp casing; of means, carried by said bracket, arranged to adjustably hold an electric lamp in said casing; a translucent panel at each end of said lamp casing; a switch casing, formed by oppositely recessed portions of said bracket members; and an electric switch in said switch casing, in operative relation with said lamp.

8. The combination with a bracket formed of two opposite members having at one end supporting means arranged to detachably secure them to a vehicle, and having at the other end adjustable clamping means arranged to adjustably hold a mirror in variable angular relation to said bracket; and having, in such position as to illuminate a field being reflected by said mirror, a lamp casing; of means, carried by said bracket, arranged to adjustably hold an electric lamp in said casing; a translucent panel at each end of said lamp casing; a switch casing, formed by oppositely recessed portions of said bracket members; and an electric switch in said switch casing, in operative relation with said lamp.

9. The combination with a bracket formed of two opposite members having at one end supporting means arranged to detachably secure them to a vehicle, and having at the other end adjustable clamping means arranged to adjustably hold a mirror in variable angular relation to said bracket; and having, in such position as to illuminate a field being reflected by said mirror, a lamp casing; of an electric lamp, in said casing; means, carried by said bracket, arranged to adjustably hold said lamp in said casing; a red translucent panel at one end of said lamp casing; a white translucent panel at the other end of said lamp casing; a switch casing, in said bracket; and an electric switch in said switch casing, in operative relation with said lamp.

10. The combination with a bracket including oppositely counterpart members, having supporting means arranged to secure it to a vehicle, and having adjustable clamping means arranged to adjustably hold a mirror in variable angular relation to said bracket, including openings in the respective bracket members; and having, in such position as to illuminate a field being reflected by said mirror, a lamp casing; of an electric lamp, in said casing; a red translucent panel at one end of said lamp casing; a white translucent panel at the other end of said lamp casing; and an electric switch in said bracket, in operative relation with said lamp.

11. The combination with a bracket having supporting means arranged to secure it to a vehicle, and having adjustable clamping means arranged to adjustably hold a mirror in variable angular relation to said bracket, including opposite bracket members; and having, in such position as to illuminate a field being reflected by said mirror, a lamp casing; of a lamp, in said casing; a red translucent panel at one end of said lamp casing; a white translucent panel at the other end of said lamp casing; and means, extending through one of said bracket members, whereby said lamp may be extinguished.

12. The combination with a bracket including two opposite members having supporting means, whereby said bracket may be connected with a vehicle; of a lamp casing on said bracket; an incandescent electric lamp fitted in said casing; a switch in said bracket, whereby the circuit for said lamp may be opened or closed; said bracket members having means, adapted to detachably secure a mirror, including a ball socket; a mirror carrying a ball fitted in said socket members; and clamping means whereby said mirror may be held in adjusted position to reflect light projected from said lamp.

13. The combination with a bracket including two oppositely counterpart members having at one end supporting means arranged to detachably connect them with a vehicle; said bracket members including oppositely counterpart annular frames forming a lamp casing; of an electric lamp fitted in said casing and having a plug extending in hollow shanks of said bracket members; screw means, in said casing, arranged to clamp said bracket members together upon said lamp plug; an electric switch in the hollow of said shanks, having an operating lever extending through a slot in one of said shanks; whereby the circuit for said lamp may be opened or closed; a red translucent panel at one end of said lamp casing; a white translucent panel at the other end of said lamp casing; means detachably securing said lamp panels in said casing, including stationary studs extending radially inward from the walls of said lamp casing, screw members extending radially inward from the walls of said lamp casing, and annular frames on said panels having openings adapted to receive said studs and screws.

14. The combination with a bracket including two oppositely counterpart members having at one end supporting means arranged to detachably connect them with a vehicle; said bracket members including oppositely counterpart annular frames forming a lamp casing; of an electric lamp fitted in said casing and having a plug extending in hollow shanks of said bracket members; screw means, in said casing, arranged to clamp said bracket members together upon said lamp plug; an electric switch in the hollow of said shanks, having an operating lever extending through a slot in one of said shanks; whereby the circuit for said lamp may be opened or closed; a red translucent panel at one end of said lamp casing; a white translucent panel at the other end of said lamp casing; and means detachably securing said lamp panels in said casing.

15. The combination with a bracket including two oppositely counterpart members having at one end supporting means arranged to detachably connect them with a vehicle; said bracket members including oppositely counterpart annular frames forming a lamp casing; of an electric lamp fitted in said casing and having a plug extending in hollow shanks of said bracket members; screw means, in said casing, arranged to clamp said bracket members together upon said lamp plug; an electric switch in the hollow of said shanks, having an operating lever extending through a slot in one of said shanks; whereby the circuit for said lamp may be opened or closed; a red translucent panel at one end of said lamp casing; and a white translucent panel at the other end of said lamp casing.

16. The combination with a bracket including two oppositely counterpart members having at one end supporting means arranged to detachably connect them with a vehicle; said bracket members including oppositely counterpart annular frames forming a lamp casing; of an electric lamp fitted in said casing and having a plug extending in hollow shanks of said bracket members; screws means, in said casing, arranged to clamp said bracket members together upon said lamp plug; and an electric switch in the hollow of said shanks, having an operating lever extending through a slot in one of said shanks; whereby the circuit for said lamp may be opened or closed.

17. The combination with a bracket including two oppositely counterpart members having supporting means arranged to detachably connect them with a vehicle; said bracket members respectively including complementary parts of a lamp casing, and complementary parts of a switch casing; of an electric lamp fitted in said casing; screw means, in said casing, arranged to clamp said bracket members together; screw means, in said casing, arranged to hold said lamp in adjusted position; and an electric switch in said switch casing, having an operating lever extending through a slot in one of said bracket members; whereby the circuit for said lamp may be opened or closed.

18. The combination with a bracket including two oppositely counter part members having supporting means arranged to detachably connect them with a vehicle; said bracket members respectively including complementary parts of a lamp casing; of an electric lamp fitted in said casing; screw means, in said casing, arranged to clamp said bracket members together; screw means, in said casing, arranged to hold said lamp in adjusted position; and an electric switch in said bracket, having an operating lever extending through a slot in one of said bracket members; whereby the circuit for said lamp may be opened or closed.

19. An automobile accessory, comprising a bracket having supporting means arranged to detachably connect it with a vehicle; a lamp casing on said bracket arranged to project light in opposite directions; a lamp; means adjustably securing said lamp in said casing; a mirror; and means adjustably securing said mirror in said bracket; whereby, said mirror may be adjusted to selectively reflect the field illuminated by light projected from said lamp in either direction.

20. The combination with a bracket including two oppositely counterpart members having at one end supporting means arranged to detachably connect them with a vehicle; said bracket members including oppositely counterpart annular frames forming a lamp casing; of an electric lamp fitted in said casing and having a plug extending in the hollow shanks of said bracket members; and screw means, in said casing, arranged to clamp said bracket members together upon said lamp plug.

21. The combination with a bracket including two oppositely counterpart members having at one end supporting means arranged to detachably connect them with a vehicle; said bracket members including oppositely counterpart annular frames forming a lamp casing; of an electric lamp fitted in said casing; screw means, inside said casing, arranged to clamp said bracket members together; and differently colored translucent panels in the respective frames aforesaid; whereby light from said lamp may be projected in opposite directions from said casing.

22. The combination with a bracket including two oppositely counterpart members having at one end supporting means arranged to detachably connect them with a vehicle; said bracket members including oppositely counterpart annular frames forming a lamp casing; of an electric lamp fitted in said casing; screw means, inside said casing, arranged to clamp said bracket members together; and translucent panels in the respective frames aforesaid; whereby light from said lamp may be projected in opposite directions from said casing.

23. The combination with a bracket including two oppositely counterpart members having at one end supporting means arranged to detachably connect them with a vehicle; and forming a lamp casing; of screw means inside said casing, arranged to clamp said bracket members together; and a lamp in said casing.

24. An article of manufacture, including a unitary casting having at one end a supporting member, at the other end a ball socket member, and a lamp casing member intermediate of its length.

In testimony whereof, I have hereunto signed my name at Philadelphia, Pennsylvania, this eleventh day of December, 1919.

EDWIN M. ROSENBLUTH.

Witnesses:
ARTHUR E. PAIGE,
CAROLYN E. REUTER.